(12) United States Patent
Vassigh et al.

(10) Patent No.: US 11,545,148 B2
(45) Date of Patent: Jan. 3, 2023

(54) DO NOT DISTURB FUNCTIONALITY FOR VOICE RESPONSIVE DEVICES

(71) Applicant: ROKU, INC., Los Gatos, CA (US)

(72) Inventors: Ali M. Vassigh, San Jose, CA (US); Shubhada Hebbar, Cupertino, CA (US); Christopher James Tegethoff, Portland, OR (US)

(73) Assignee: Roku, Inc., San Jose, CA (US)

( * ) Notice: Subject to any disclaimer, the term of this patent is extended or adjusted under 35 U.S.C. 154(b) by 195 days.

(21) Appl. No.: 16/808,588

(22) Filed: Mar. 4, 2020

(65) Prior Publication Data

US 2020/0402504 A1    Dec. 24, 2020

Related U.S. Application Data

(60) Provisional application No. 62/862,735, filed on Jun. 18, 2019.

(51) Int. Cl.
*G10L 17/24* (2013.01)
*G10L 15/22* (2006.01)
(Continued)

(52) U.S. Cl.
CPC .............. *G10L 15/22* (2013.01); *G10L 15/08* (2013.01); *H04R 3/00* (2013.01); *G10L 2015/088* (2013.01); *G10L 2015/223* (2013.01)

(58) Field of Classification Search
None
See application file for complete search history.

(56) References Cited

U.S. PATENT DOCUMENTS 8,621,251 B1 * 12/2013 Keller .................. G06F 1/3209
                                                        713/320
9,697,822 B1 *  7/2017 Naik ...................... G10L 15/22
(Continued)

FOREIGN PATENT DOCUMENTS

KR    10-2017-0078331 A    7/2017
KR    10-2019-0042903 A    4/2019

OTHER PUBLICATIONS

International Search Report and Written Opinion of the International Searching Authority directed to related International Patent Application No. PCT/US2020/036912, dated Sep. 24, 2020; 7 pages.

*Primary Examiner* — Seong-Ah A Shin
(74) *Attorney, Agent, or Firm* — Sterne, Kessler, Goldstein & Fox P.L.L.C.

(57) ABSTRACT

Provided herein are system, apparatus, article of manufacture, method and/or computer program product embodiments, and/or combinations and sub-combinations thereof, for enabling Do Not Disturb functionality in voice responsive devices. An example embodiment operates by: enabling an user to configure Do Not Disturb settings for a voice responsive device; while (a) the Do Not Disturb functionality is activated for the voice responsive device, and (b) within a Do Not Disturb time period specified by the Do Not Disturb settings: disabling one or more microphones; receiving an unambiguous trigger; responsive to receiving the unambiguous trigger, enabling the microphone(s); receiving a voice command; and processing the voice command. An example of an unambiguous trigger may be the user pressing a talk button (either a physical or digital button) on a remote control associated with the voice responsive device.

25 Claims, 4 Drawing Sheets

(51) Int. Cl.
*G10L 15/08* (2006.01)
*H04R 3/00* (2006.01)

(56) References Cited

U.S. PATENT DOCUMENTS

| | | | | |
|---|---|---|---|---|
| 2004/0223599 | A1* | 11/2004 | Bear | H04M 3/436 |
| | | | | 379/207.02 |
| 2007/0201639 | A1* | 8/2007 | Park | G10L 15/30 |
| | | | | 704/E15.047 |
| 2014/0278444 | A1 | 9/2014 | Larson et al. | |
| 2015/0206529 | A1* | 7/2015 | Kwon | G10L 15/22 |
| | | | | 704/246 |
| 2016/0260436 | A1* | 9/2016 | Lemay | G06F 3/167 |
| 2018/0210703 | A1* | 7/2018 | Meyers | G10L 15/32 |
| 2018/0239812 | A1 | 8/2018 | Yang et al. | |
| 2018/0338035 | A1* | 11/2018 | Johnson | H04M 1/576 |
| 2019/0281387 | A1* | 9/2019 | Woo | G06F 9/485 |

* cited by examiner

DO NOT DISTURB FUNCTIONALITY FOR VOICE RESPONSIVE DEVICES

CROSS-REFERENCE TO RELATED APPLICATIONS

This application claims priority to U.S. Provisional Application No. 62/862,735, titled "Do Not Disturb Functionality For Voice Responsive Devices," filed on Jun. 18, 2019, which is herein incorporated by reference in its entirety.

BACKGROUND

Field

This disclosure is generally directed to Do Not Disturb functionality for voice responsive devices.

Background

Voice responsive devices have microphones for receiving voice commands spoken by users. But, generally, voice responsive devices do not leave their microphones fully on all the time, due to privacy reasons (users do not want to be listened to constantly) and cost reasons (it is too expensive in terms of computing and networking resources to continually process everything that is heard).

Because the microphones are not always fully on all the time, voice responsive devices require a trigger to fully turn on their respective microphones. A trigger is a way for an user to tell his device that "I'm talking to you so pay attention."

An example trigger is a wake word. Thus, even when their microphones are not fully on, voice responsive devices listen for, and activate upon hearing, their respective wake words. For example, for the APPLE IPHONE, the wake word is "HEY SIRI." For ROKU media streaming devices (such as ROKU TV), the wake word is "HEY ROKU." For the AMAZON ECHO, the wake word is "ALEXA."

But the detection of spoken wake words is not completely reliable. It is possible that the system may mistakenly think that it heard "HEY ROKU". In such a case, powering up the TV and the display could be very disruptive and frustrating for the user. For example, suppose two people are having a late night conversation, and the ROKU TV in the same room mistakenly believes it hears "HEY ROKU". In this scenario, it will be disruptive to the people in the room when the TV powers up (thereby lighting the room from the TV display), and the room fills with sound from the TV.

Some voice responsive devices enable users to turn the microphone on/off to preserve privacy and prevent accidental activation. However, per the example scenario above, if users want to avoid having their TV accidentally turned on, they would have to manually mute the microphone and then remember at some later time to unmute it. For example, turning it off at night and remembering to turn it back on in the morning. This routine could become so tiresome that many people may simply opt to leave the microphone off permanently.

SUMMARY

Provided herein are system, apparatus, article of manufacture, method and/or computer program product embodiments, and/or combinations and sub-combinations thereof, for enabling Do Not Disturb functionality in voice responsive devices.

An example embodiment operates by: enabling an user to configure Do Not Disturb settings for a voice responsive device; while (a) the Do Not Disturb functionality is activated for the voice responsive device, and (b) within a Do Not Disturb time period specified by the Do Not Disturb settings: disabling one or more microphones; receiving an unambiguous trigger; responsive to receiving the unambiguous trigger, enabling the microphone(s); receiving a voice command; and processing the voice command. An example of an unambiguous trigger may be the user pressing a talk button (either a physical or digital button) on a remote control associated with the voice responsive device.

Further embodiments, features, and advantages of the present disclosure, as well as the structure and operation of the various embodiments of the present disclosure, are described in detail below with reference to the accompanying drawings.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, article of manufacture, method and/or computer program product embodiments, and/or combinations and sub-combinations thereof, for enabling Do Not Disturb functionality in voice responsive devices.

Figure 1:
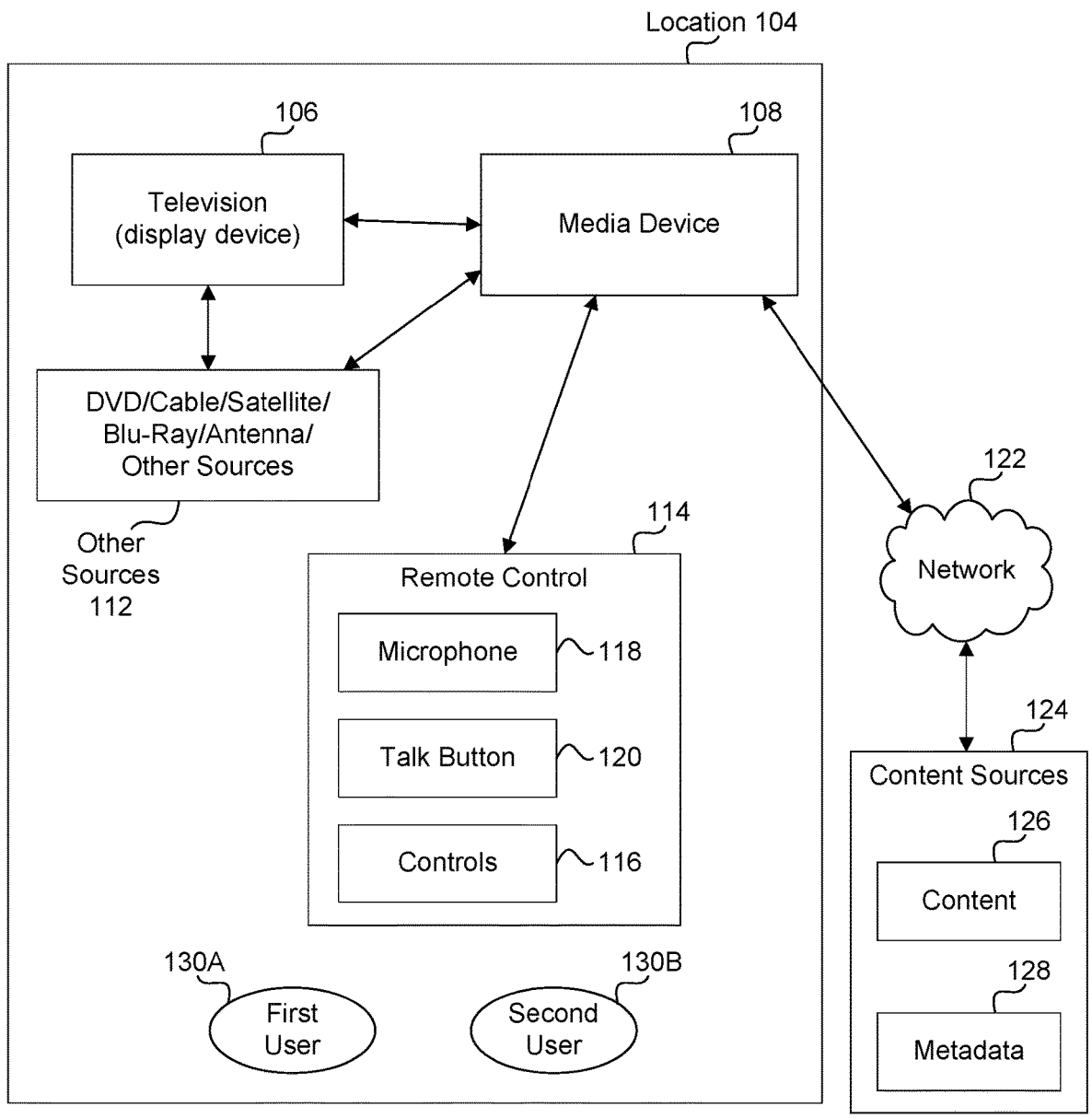
FIG. 1 illustrates a block diagram of a multimedia entertainment environment, according to some embodiments.

FIG. 1 illustrates a block diagram of a computing environment 102, according to some embodiments. The computing environment 102 includes a plurality of locations 104. Each location 104 may be a home, family room, bedroom, basement, office, bar, restaurant, park, public space, theater, etc.

Each location 104 may include one or more display devices 106. Display devices 106 may be any combination of monitors, televisions (TVs), computers, smart phones, tablets, wearables (such as a watch), appliances, and/or projectors, to name just some examples. The display device 106 in FIG. 1 may be referred to herein as television 106 or TV 106, but it should be understood that this disclosure is not limited to that example.

Each display device 106 may be connected to a media device 108. Each media device 108 may be separate from its respective television 106, or may be part of or integrated with the television 106.

Media device 108 may be a streaming media device (that is, a streaming content source) that may stream content 126 from content sources 124, and may provide such content 126 to its respective television 106 for playback to users 130 at the location 104. For example, media device 108 may stream content 126 from content sources 124 via network 122.

Network 122 may be any wired and/or wireless network, medium or communication protocol such as WIFI, Bluetooth, infrared, cellular, etc., or any combination thereof.

Each content source 124 may store content 126 and metadata 128. Content 126 may include any combination of music, videos, movies, TV programs, multimedia, images, still pictures, text, graphics, gaming applications, advertisements, programming content, public service content, government content, local community content, software, and/or any other content or data objects in electronic form.

Metadata 128 may include data about content 126. For example, metadata 128 may include associated or ancillary information indicating or related to writer, director, producer, composer, artist, actor, summary, chapters, production, history, year, trailers, alternate versions, related content, applications, and/or any other information pertaining or relating to the content 126. Metadata 128 may also or alternatively include links to any such information pertaining or relating to the content 126. Metadata 128 may also or alternatively include one or more indexes of content 126, such as but not limited to a trick mode index.

The television 106 may also receive content for playback from any number of other sources 112 (which may be non-streaming content sources) in addition to media device 108, such as cable or satellite, an over-the-air antenna, a Blu-Ray/DVD player, etc., to name just some examples.

Some of the electronic devices in location 104 may be voice responsive. That is, these devices may respond to audio (voice) commands spoken by users 130.

Figure 2:
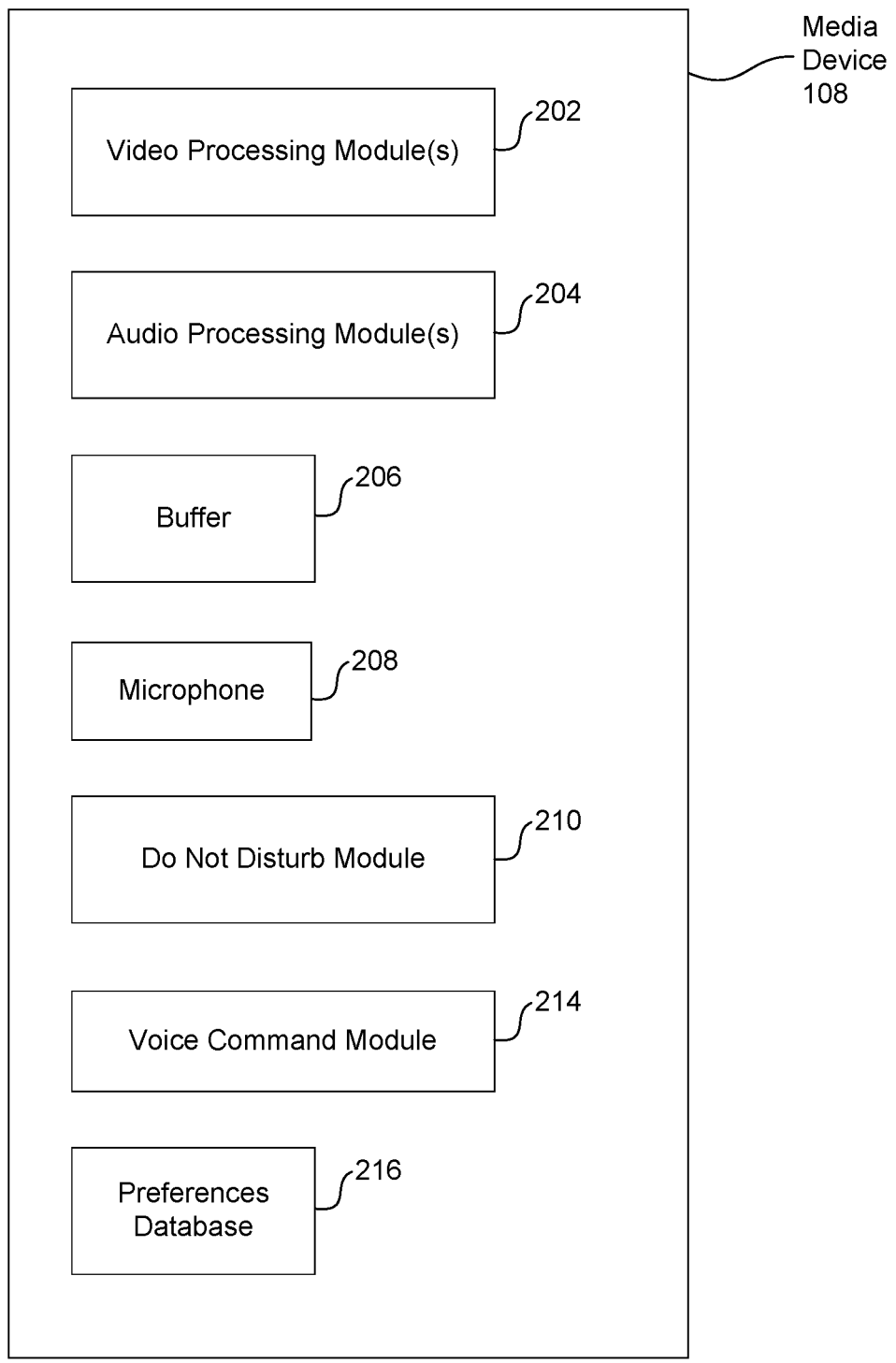
FIG. 2 illustrates a block diagram of a voice responsive media device, according to some embodiments.

FIG. 2 illustrates an example media device 108, according to some embodiments. In some embodiments, the media device 108 is voice responsive.

The media device 108 may include one or more video processing modules 202, and one or more audio processing modules 204.

Each video processing module 202 may be configured to decode, encode and/or translate video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video processing module 202 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Similarly, each audio processing module 204 may be configured to decode, encode and/or translate audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Media device 108 may also include buffer 206 for buffering video, as well as other types of data.

As noted above, in some embodiments, the media device 108 is voice responsive. In other words, the media device 108 is configured to respond to voice commands spoken by users 130. Thus, the media device 108 may include a microphone 208 for receiving audio input, such as spoken voice commands from users 130. As shall be described in greater detail below, a remote control 114 (see FIG. 1) may also include a microphone 118 for receiving audio voice commands spoken by users 130. Similarly, other devices may include a microphone (not shown) for receiving audio voice commands, such as TV 106 and/or other sources 112, and these devices (and the microphones contained therein) may be located throughout location 104. In some embodiments, the microphone 208 in the media device 108 may be a far field microphone, and the microphone 118 in the remote control 114 may be a near field microphone. Far field microphones may also be in the TV 106 and/or other sources 112. However, this disclosure is not limited to this example.

The media device 108 may include a voice command module 214 for recognizing and executing audio (voice) commands spoken by users 130 (as received by either microphone 118, 208, or the other microphones described herein).

Referring back to FIG. 1, users 130 may use a remote control 114 to control the media device 108. The remote control 114 may also control the TV 106 and/or any of the other sources 112. The remote control 114 may be a smartphone, tablet, personal digital assistant, appliance, Internet of Things (IoT) device, software application, or remote control, to name just some examples.

The remote control 114 may include controls 116, such as a numeric keypad, channel up and down, volume up and down, source, menu, arrows up and down, arrows left and right, on/off, etc. The remote control 114 may also include a touch screen (not shown). The remote control 114 may further include the microphone 118 described above, for receiving audio input from users 130.

The remote control 114 may include a talk button 120. In some embodiments, an user 130 may indicate an intent to issue a spoken voice command by pressing the talk button 120. In other words, the user 130 may press the talk button 120, and then speak the desired voice command. Thereafter, upon receipt of the audio data representing the voice command by the microphone 118, the remote control 114 may transmit the audio data to the media device 108. Also, the remote control 114 may transmit to the media device 108 data indicating that the talk button 120 was pressed just prior to or while the audio data was received by the microphone 118. The remote control 114 may transmit such data to the media device 108 using any communication protocol, mechanism or technique, such as WIFI, cellular, infrared, etc. The touch screen of the remote control 114 may also or alternatively include a digital talk button, which works similarly to the physical talk button 120.

In some embodiments, microphones 118, 208 in the remote control 114 and the media device 108 (as well as the other microphones described herein) are not fully on all the time. This is the case, due to privacy reasons (users do not want to be listened to constantly) and cost reasons (it is too expensive in terms of computing and networking resources to continually process everything that is heard).

Because the microphones 118, 208 are not always fully on all the time, the media device 108 may use triggers to fully turn on the microphones 118, 208. When an user 130 initiates a trigger, the user 130 is essentially telling the media device 108 "I'm talking to you so pay attention."

Triggers may be unambiguous or ambiguous. With unambiguous triggers, there is certainty (or at least more certainty, as compared to an ambiguous trigger) that the user 130 actually issued a voice command. An example of an unambiguous trigger is when the user 130 presses the talk button 120 on the remote control 114 before speaking a voice command, as described above.

With an ambiguous trigger, there is less certainty (as compared to unambiguous triggers) that the user 130 actually issued a voice command. An example of an ambiguous trigger is detection of a wake word by the media device 108.

As discussed above, the detection of spoken wake words is not completely reliable. In an example of ROKU TV, it is possible that the media device 108 (which may be part of the TV 106 in this example) may mistakenly think that it heard the wake word trigger "HEY ROKU". In such a case, powering up the TV 106 and filling the room with audio and video could be very disruptive and frustrating for the user.

To address this problem, the media device 108 may include Do Not Disturb functionality and a Do Not Disturb module 210. The Do Not Disturb module 210 enables users 130 to specify (1) a Do Not Disturb time period; and optionally (2) one or more actions (called prohibited actions) that the media device 108 does not perform during the Do Not Disturb time period (even after receiving an unambiguous trigger, as described below). These specifications may be called Do Not Disturb settings. The Do Not Disturb module 210 operates to prevent the media device 108 from responding to voice commands during the Do Not Disturb time period, except when an unambiguous trigger has been received. The Do Not Disturb settings for the media device 108 may be stored in a preferences database 216.

Also or alternatively to (2) in the preceding paragraph, the Do Not Disturb settings may specify one or more actions (called permitted actions, in contrast to prohibited actions) that the media device 108 may perform during the Do Not Disturb time period after receipt of an unambiguous trigger. While the following describes Do Not Disturb functionality in terms of prohibited actions, persons skilled in the relevant art(s) will understand how to apply these teachings to permitted actions.

Also, while Do Not Disturb functionality is described herein with respect to the media device 108 and the TV 106, this disclosure is not so limited. Instead, the Do Not Disturb functionality described herein may be applied to any voice responsive electronic device.

Examples of prohibited actions may include, but are not limited to the following. Other prohibited actions will be apparent to persons skilled in the relevant art(s) based on the teachings contained herein.

Turning the TV 106 on;
Allowing the media device 108 or TV 106 to play sound (such as status messages);
Allowing the media device 108 or TV 106 to play certain channels or content; and/or
Responding to voice commands spoken by users 130.

Figure 3:
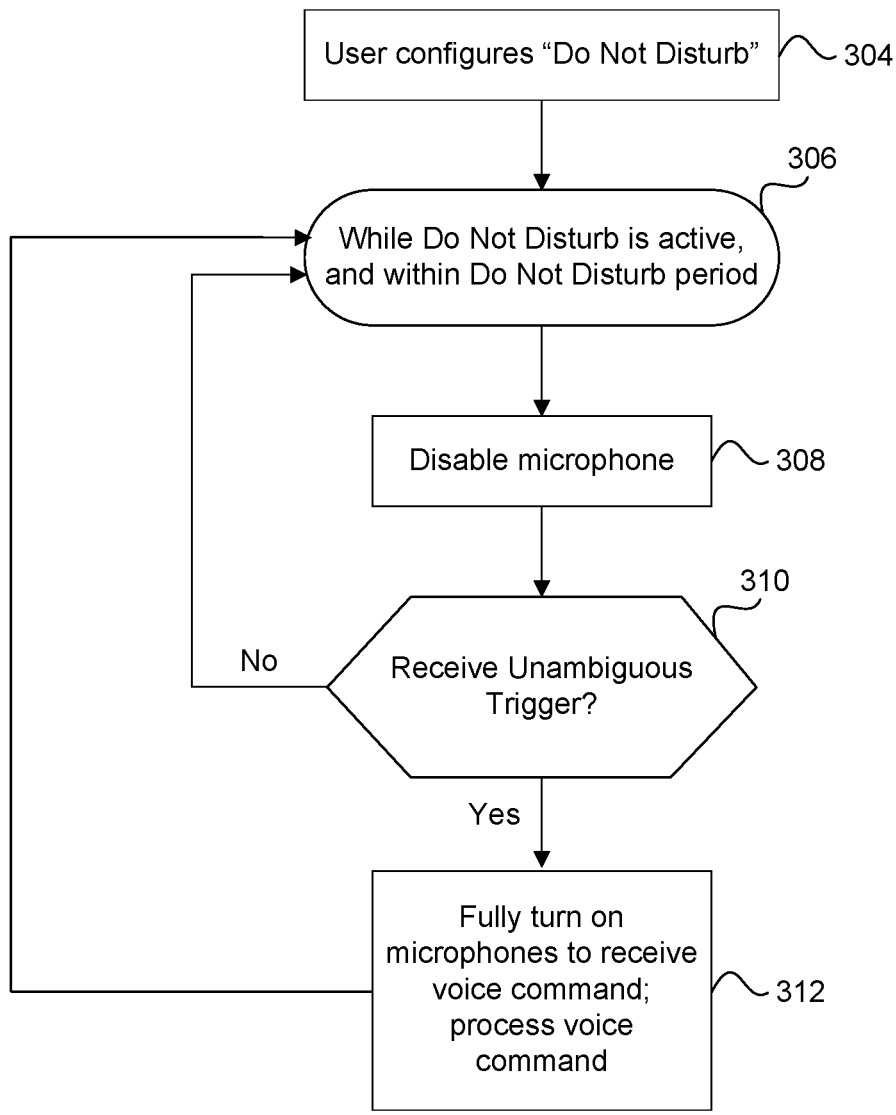
FIG. 3 illustrates a flowchart for enabling Do Not Disturb functionality in a voice responsive electronic device, according to some embodiments.

FIG. 3 illustrates a method 302 for enabling Do Not Disturb functionality in a voice responsive electronic device, according to some embodiments. Method 302 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 302 shall be described with reference to FIGS. 1 and 2. However, method 302 is not limited to those example embodiments.

In 304, an user 130 may configure "Do Not Disturb" functionality. For example, the user 130 may configure "Do Not Disturb" functionality with the media device 108 using the remote control 114. In 304, the user 130 may specify: (1) a Do Not Disturb time period (such as 10 pm to 6 am on weekdays); (2) optionally, one or more actions (called prohibited actions) that the media device 108 will not perform during the Do Not Disturb time period, even after receiving an unambiguous trigger (as discussed below in 310); and (3) whether the Do Not Disturb function is activated. These specifications may be collectively called Do Not Disturb settings. Non-limiting examples of prohibited actions are provided above. The Do Not Disturb settings may be stored in the preferences database 216.

As indicated by 306, the following operations (that is, 308, 310 and 312 in FIG. 3) are performed (a) during the Do Not Disturb time period, and (b) when one of the users 130 has activated the Do Not Disturb function.

In 308, the microphone 208 in the media device 108 and the microphone 118 in the remote control 114 (and, in some embodiments, other microphones described herein) are turned off (that is, muted) so they are not listening for anything, including not listening for voice commands from users 130.

In 310, the media device 108 determines if it has received an unambiguous trigger from an user 130. If an unambiguous trigger has not been received, the media device 108 loops back to 306.

As discussed above, an example of an unambiguous trigger is the user 130 pressing the physical talk button 120 or a digital talk button on the remote control 114.

An example of an ambiguous trigger is receipt of a wake word by microphone 118 in the remote control 114, or microphone 208 in the media device 108. This is the case because, as further discussed above, the detection of spoken wake words is not completely reliable. But while Do Not Disturb is active, it is not possible for the media device 108 to receive such ambiguous triggers since the microphones 108, 208 are turned off per 308.

If an unambiguous trigger has been received, then 312 is performed. In 312, the microphones 108, 208 are turned on and the media device 108 listens for a voice command from the user 130. Upon receipt of a voice command, the voice command module 214 in the media device 108 processes the voice command. Then, control returns to 306 where, if Do Not Disturb is still active, the microphones 118, 208 are turned off per 308.

In some embodiments, all voice commands are processed in 312 as just described above. In other embodiments, only voice commands that are not prohibited actions are processed in 312. For example, when Do Not Disturb is active, some users 130 may wish to restrict certain actions that the media device 108 may be allowed to perform, such as playing sound, or playing certain channels or content. In this case, the users 130 may establish these actions as prohibited actions so they are not processed when Do Not Disturb is active, even after receipt of an unambiguous trigger.

When Do Not Disturb is no longer active (that is, when outside the Do Not Disturb time period, or the user 130 disables the Do Not Disturb function), then the microphones 118, 208 are turned back on, such that they listen for wake words.

Example Computer System

Figure 4:
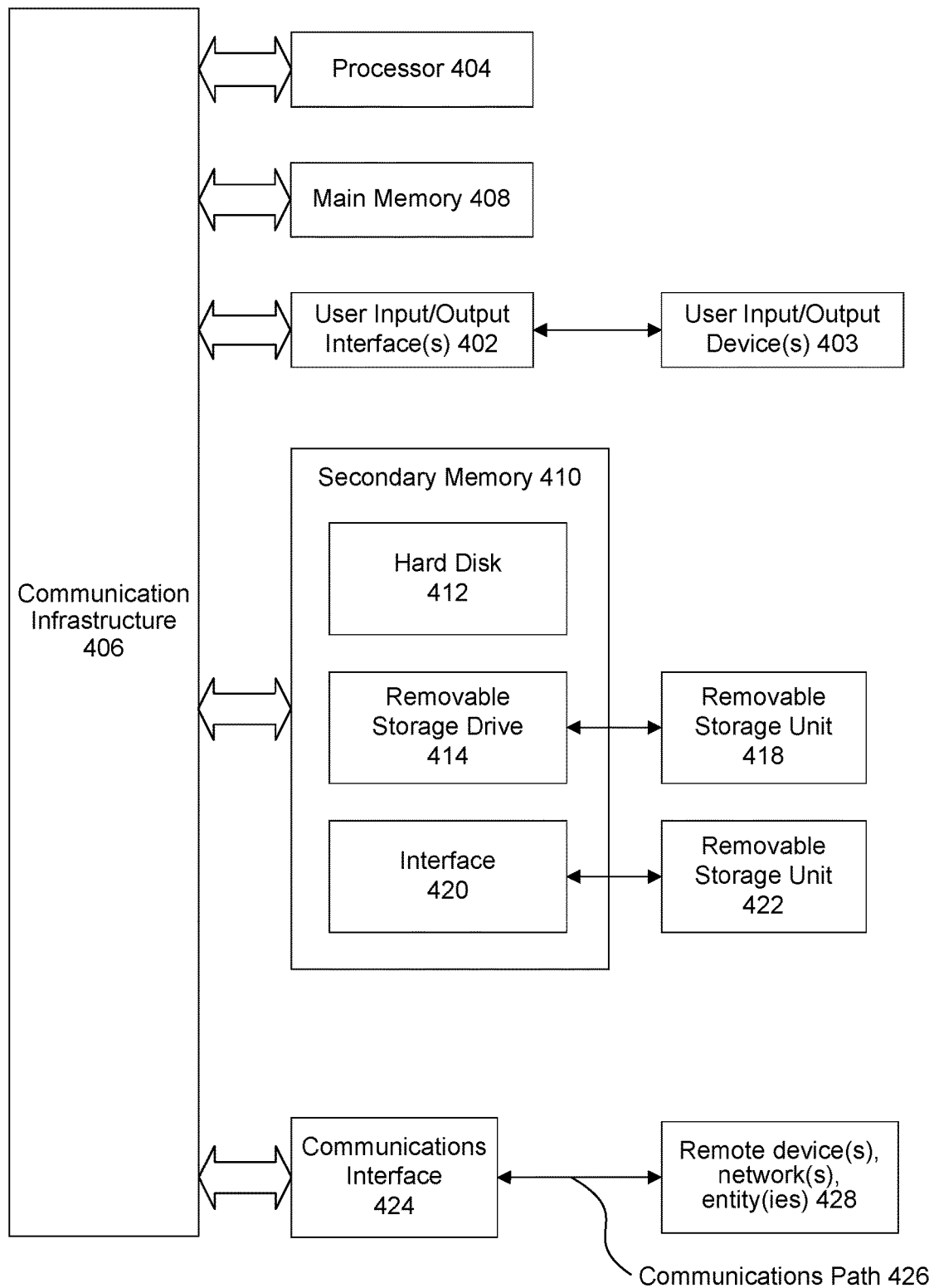
FIG. 4 illustrates an example computer system useful for implementing various embodiments.

Various embodiments and/or components therein can be implemented, for example, using one or more computer systems, such as computer system 400 shown in FIG. 4. Computer system 400 can be any computer or computing device capable of performing the functions described herein. For example, one or more computer systems 400 or portions thereof can be used to implement any embodiments of FIGS. 1-3, and/or any combination or sub-combination thereof.

Computer system 400 includes one or more processors (also called central processing units, or CPUs), such as a processor 404. Processor 404 is connected to a communication infrastructure or bus 406.

One or more processors 404 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (i.e., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary embodiment, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments as contemplated by the inventors, and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for enabling Do Not Disturb functionality in a voice responsive device, comprising:
   detecting Do Not Disturb settings for the voice responsive device received from a user, the Do Not Disturb settings comprising a schedule during which to automatically activate and deactivate the Do Not Disturb functionality;
   determining a prohibited action that will not be performed during a period while the Do Not Disturb functionality is activated in accordance with the schedule;
   while (a) the Do Not Disturb functionality is activated for the voice responsive device, and (b) within the schedule:
   disabling one or more microphones;
   receiving an unambiguous trigger;
   responsive to receipt of the unambiguous trigger, enabling the one or more microphones;
   receiving a voice command; and
   processing the voice command, wherein if it is determined that the voice command corresponds to the prohibited action and the voice command was received during the period, then the prohibited action is not performed.

2. The method of claim 1, wherein the receiving the unambiguous trigger comprises:
   receiving an indication that the user pressed a button on a remote control.

3. The method of claim 2, wherein the button is a physical button or a digital button.

4. The method of claim 1, wherein the Do Not Disturb settings include one or more prohibited actions, wherein the processing comprises:
   determining that the voice command does not correspond to one of the one or more prohibited actions; and
   responsive to the determination, processing the voice command.

5. The method of claim 1, wherein the processing comprises:
   determining that the voice command corresponds to the prohibited action; and
   responsive to the determination, preventing processing of the voice command.

6. The method of claim 1, further comprising:
   after processing the voice command, disabling the one or more microphones.

7. The method of claim 1, wherein ambiguous triggers are ignored while the Do Not Disturb functionality is activated, and within the schedule.

8. The method of claim 1, further comprising:
   reactivating the one or more microphones when the Do Not Disturb functionality is deactivated, or outside the schedule.

9. The method of claim 1, further comprising:
   determining a permitted action that can be performed while the Do Not Disturb functionality is activated;
   receiving the permitted action while the Do Not Disturb functionality is activated; and
   processing the permitted action while the Do Not Disturb functionality is activated.

10. The method of claim 1, wherein otherwise the voice command is performed.

11. A non-transitory computer-readable medium having instructions stored thereon that, when executed by at least one computing device, causes the at least one computing device to perform operations to enable Do Not Disturb functionality in a voice responsive device, the operations comprising:
    detecting Do Not Disturb settings for the voice responsive device received from a user, the Do Not Disturb settings comprising a schedule during which to automatically activate and deactivate the Do Not Disturb functionality;
    determining a prohibited action that will not be performed during a period while the Do Not Disturb functionality is activated in accordance with the schedule;
    while (a) the Do Not Disturb functionality is activated for the voice responsive device, and (b) within the schedule:
    disabling one or more microphones;
    receiving an unambiguous trigger;
    responsive to receipt of the unambiguous trigger, enabling the one or more microphones;
    receiving a voice command for the prohibited action; and
    processing the voice command, wherein if it is determined that the voice command corresponds to the prohibited action and the voice command was received during the period, then the prohibited action is not performed.

12. The non-transitory computer-readable medium of claim 11, wherein the receiving the unambiguous trigger comprises:
    receiving an indication that the user pressed a button on a remote control.

13. The non-transitory computer-readable medium of claim 12, wherein the button is a physical button or a digital button.

14. The non-transitory computer-readable medium of claim 11, wherein the Do Not Disturb settings include one or more prohibited actions, wherein the processing comprises:
    determining that the voice command does not correspond to one of the one or more prohibited actions; and
    responsive to the determination, processing the voice command.

15. The non-transitory computer-readable medium of claim 11, wherein the processing comprises:
    determining that the voice command corresponds to the prohibited action; and
    responsive to the determination, preventing processing of the voice command.

16. The non-transitory computer-readable medium of claim 11, the operations further comprising:
    after processing the voice command, disabling the one or more microphones.

17. The non-transitory computer-readable medium of claim 11, wherein ambiguous triggers are ignored while the Do Not Disturb functionality is activated, and within the schedule.

18. The non-transitory computer-readable medium of claim 11, wherein the operations further comprise:
    reactivating the one or more microphones when the Do Not Disturb functionality is deactivated, or outside the schedule.

19. A voice responsive electronic device having Do Not Disturb functionality, comprising:
    at least one processor configured to perform operations comprising:

detecting Do Not Disturb settings for the voice responsive electronic device received from a user, the Do Not Disturb settings comprising a schedule during which to automatically activate and deactivate the Do Not Disturb functionality;

determining a prohibited action that will not be performed during a period while the Do Not Disturb functionality is activated in accordance with the schedule;

while (a) the Do Not Disturb functionality is activated for the voice responsive electronic device, and (b) within the schedule:

disabling one or more microphones;

receiving an unambiguous trigger;

responsive to receipt of the unambiguous trigger, enabling the one or more microphones;

receiving a voice command for the prohibited action; and processing the voice command, wherein if it is determined that the voice command corresponds to the prohibited action and the voice command was received during the period, then the prohibited action is not performed.

20. The voice responsive electronic device of claim 19, wherein the receiving the unambiguous trigger comprises:

receiving an indication that the user pressed a button on a remote control.

21. The voice responsive electronic device of claim 20, wherein the button is a physical button or a digital button.

22. The voice responsive electronic device of claim 19, wherein the Do Not Disturb settings include one or more prohibited actions, wherein the processing comprises:

determining that the voice command does not correspond to one of the one or more prohibited actions; and responsive to the determination, processing the voice command.

23. The voice responsive electronic device of claim 19, wherein the processing comprises:

determining that the voice command corresponds to the prohibited action; and responsive to the determination, preventing processing of the voice command.

24. The voice responsive electronic device of claim 19, wherein ambiguous triggers are ignored while the Do Not Disturb functionality is activated, and within the schedule.

25. The voice responsive electronic device of claim 19, wherein the operations further comprise:

reactivating the one or more microphones when the Do Not Disturb functionality is deactivated, or outside the schedule.

* * * * *